(12) United States Patent
Johnson

(10) Patent No.: US 6,718,546 B1
(45) Date of Patent: Apr. 6, 2004

(54) APPLICATION MANAGEMENT

(75) Inventor: Andrew Johnson, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/433,083

(22) Filed: Nov. 3, 1999

(30) Foreign Application Priority Data

Apr. 23, 1999 (GB) ............................................. 9909274

(51) Int. Cl.$^7$ ................................................ G06F 9/44
(52) U.S. Cl. ...................... 717/169; 717/120; 717/121; 717/122; 717/170
(58) Field of Search ................................ 717/169–170, 717/120–122

(56) References Cited

U.S. PATENT DOCUMENTS

| | | | |
|---|---|---|---|
| 5,619,698 A | * 4/1997 | Lillich et al. ................ | 717/168 |
| 5,790,856 A | 8/1998 | Lillich | |
| 5,790,860 A | 8/1998 | Wetmore et al. | |
| 5,796,974 A | * 8/1998 | Goddard et al. ............ | 712/211 |

FOREIGN PATENT DOCUMENTS

| | | | |
|---|---|---|---|
| EP | 0 263 447 A2 | * 4/1988 | ............. G06F/9/30 |
| JP | 64-002139 | 1/1989 | |
| JP | 2-224122 | 9/1990 | |
| JP | 2224122 | 9/1990 | |
| JP | 8-095771 | 4/1996 | |
| JP | 8-179940 | 7/1996 | |
| JP | 9-034755 | 2/1997 | |
| WO | WO 96/32679 | 8/1996 | |
| WO | WO 97/17656 | 5/1997 | |
| WO | WO 98/57255 | 12/1998 | |

OTHER PUBLICATIONS

United Kingdom Office Action dated Apr. 30, 2003.

* cited by examiner

Primary Examiner—Tuan Q. Dam
Assistant Examiner—Ted T. Vo
(74) Attorney, Agent, or Firm—Richard M. Ludwin; McGinn & Gibb, PLLC

(57) ABSTRACT

This invention relates to management of a computer application. In particular it relates to the optimization of an application which is written for more than one platform. There is disclosed apparatus, program code and a method for resolving a program code module (such as a DLL) in a computer platform, said method comprising: loading a module into memory; locating specified operation code within the module; selecting a DLL patch for the operation code; and modifying the operation code with the patch according to DLL methods. The operating system uses the dynamic module loader to patch operational code into an application to optimise the application for that operating system and platform. It reduces the need to create a different application for each platform and operating system combination. The operation code is pointed to by a module header fix up location pointer. The above solution causes the code to be patched at load time and advantageously by the operating system itself. All the application program has to do is to ensure that the appropriate DLL exporting the right instruction sequence is installed. Additional benefits are that the code remains non-writable and cannot be corrupted, there is no call-return overhead. Furthermore there is faster execution, in the single processor example, the only overhead is one nop instruction.

31 Claims, 5 Drawing Sheets

APPLICATION MANAGEMENT

FIELD OF INVENTION

This invention relates to management of a computer application. In particular it relates to the optimization of a computer application which is written for more than one platform.

BACKGROUND OF INVENTION

Some computer programs require different instruction sequences on different hardware, or different versions of the operating system. For example, on the Intel x86 range of processors a program may need to update a memory location in an atomic fashion. If the machine has a single microprocessor, then the instruction inc [counter] will read the memory location 'counter', add one to the value retrieved, and store the result back into the memory location. As all this occurs in one machine instruction, the program cannot be interrupted during this operation, so another thread of program execution could not update the location at the same time. On a multiprocessor machine, another processor could read the memory location after the first processor has done the read, but before it has done the write. If the second processor is also attempting to increment a value at the memory location then an increment will be lost. To prevent this happening, the Intel instruction set provides the lock prefix, which prevents a second processor from accessing the memory location until the read-modify-write instruction is complete. The lock prefix (lock inc [counter]) could be used on a single processor machine, but there is a performance disadvantage, as the prefix may result in the memory cache system being bypassed. There is therefore a need to selectively include the lock prefix on single processor machines.

Previously different versions of the software for each environment need to be shipped. This can double the size of the shipped program code, and provide maintenance complexities as when a new or fixed version is shipped it must be built for all the different environments.

Another disadvantage is that any patches to the application must be applied at run time. This requires the code to be in a writable piece of memory, which could allow the program code to be corrupted accidentally or maliciously. However some operating systems or processors do not allow writable code memory, or make it complex. E.g. Intel x86 processors have executable, and possibly readable code segments, but not writable code segments. The code segment would need to be aliased by a writable data segment for the code to be patched.

It is possible to use a subroutine for the operation but this adds a call and return overhead to the instruction.

SUMMARY OF INVENTION

A method of resolving a program code module in a computer platform, said method comprising: loading a module into memory; locating operation code within the module; selecting a patch for the operation code; and modifying the operation code with the patch.

The operating system uses the dynamic module loader to patch operational code into an application to optimise the application for that operating system and platform. It reduces the need to create a different application for each platform and operating system combination. The operation code is pointed to by a module header fix up location pointer.

The above solution causes the code to be patched at load time and advantageously by the operating system itself. All the application program has to do is to ensure that the appropriate DLL exporting the right instruction sequence is installed. Additional benefits are that the code remains non-writable and cannot be corrupted, and there is no call-return overhead. Furthermore there is faster execution, in the single processor example, the only overhead is one nop instruction.

Each module may contain more than one operation code location for modifying. Each fix up location may contain the same or different operation codes and may respectively relate to the same or different patches. Such relationship between the operational code and the patch is defined in a header.

The fix up operation code may be located in the module by looking up fix up references in a table within the module header. The same header may indicate the name of the patch to be used.

The platform has an operating system which may contain at least one patch for a fix up operation code. The patches may be preloaded into the operating system and remain there semi permanently or may be preloaded with initialisation of the application. Alternatively the patches may be loaded on demand from the same source as the application.

The patch may be superimposed over the fix up operation code by directly loading into that memory location.

Advantageously the patch may be exported from a dynamic link library. The patch may be a dynamic link library file and may behave just as a DLL. The process to overlay the instructions in the patch is the same as for known dynamic linking and no adaptation of the operating system is required.

An operating system that has the functionality to handle dynamic link libraries does not have to be modified to enable the invention. Therefore an embodiment of the invention maybe implemented on a number of operating systems which have the capacity for dynamic linking.

The fix up operation instruction may be a no operation instruction whereby the option of superimposing a prefix operation for the following operation is allowed. For platforms not requiring a prefix operation the no operation instruction will remain in place with minimal overhead. If a patch for such a system was loaded it would contain a no operation instruction to negate the effect. For platforms which would benefit from a prefix, a patch would contain that prefix and replace the no operation instruction without disruption to the following or preceding code.

Advantageously, when the platform is multiprocessor, the prefix operation is a lock operation to lock memory from other processors during a modify read write instruction. This allows a single object code application to be used for single processor platforms and for multiple processor platforms.

Another beneficial use of the embodiment is when the fix up location is a call subroutine instruction and the patch modifies the call subroutine instruction. For instance the subroutine may be optional for different platforms or may be a trace which is used on occasion during and after development of the application.

A further beneficial use of the embodiment is when the fix up location is an offset into a structure and the patch modifies the offset. Normally structure sizes must be maintained across DLL versions to preserve compatibility. If offsets are imported as dynamic values, then the offsets can change independently of the program.

Fix up locations may point to addresses for known dynamic linking as well as to operational code.

An operating system for resolving a program code module into a computer platform, said operating system: means for loading a module into memory; means for locating certain operation code within the module; means for selecting a patch for the operation code; and means for modifying the operation code with the patch.

The invention provides a program module for loading into a computer platform, said program module comprising a code segment and a fix up pointer; said pointer having a location value of an operational code field in the code segment and said pointer being associated with another module; whereby on being loaded to the computer platform the operation code is modified by patching the associated module.

Increasingly computer applications are using more operational memory than before. One of the factors contributing to this demand has been the move towards object oriented programming techniques which break an application into many separate and independent modules rather than a single contiguous piece of code. Since a module has some degree of independence it may be loaded into memory only when referenced by another module. When referenced, a module is loaded into memory and linked into the application. That is, references from the application to the module are hard coded so that the processor can seamlessly jump from the application to the module and back. One known module for loading and linking is a dynamic link library file (DLL). A jump or call instruction which is linked to a DLL file has an instruction field for the op code and an empty address field linked to the referenced DLL file. A dynamic link resolver locates the name of the DLL in an established module by looking up a table of the references in the header of the established module. The DLL file is loaded into a specific memory location and the resolver links or updates the address field of the instruction with an absolute or relative address of the specific memory location.

The invention uses the dynamic linking facility of the operating system to patch instruction sequences, rather than offsets or addresses of routines to be linked to. It patches instruction sequences using dynamic linking for different operating system and processor versions of a computer program. Either the application program or the operating system can provide a dynamic link library which rather than exporting entry point address, exports actual instruction sequences. Different versions of these dynamic link libraries are then made exporting different instruction sequences as up to 4 bytes of data as though these were entry point address of routines. These are then imported by the calling routine, and treated as actual instruction opcodes.

DESCRIPTION OF DRAWINGS

In order to promote a fuller understanding of this and other aspects of the present invention, an embodiment will now be described, by way of example only, with reference to the accompanying drawings in which.

DETAILED DESCRIPTION OF PREFERRED EMBODIMENT

Figure 1:
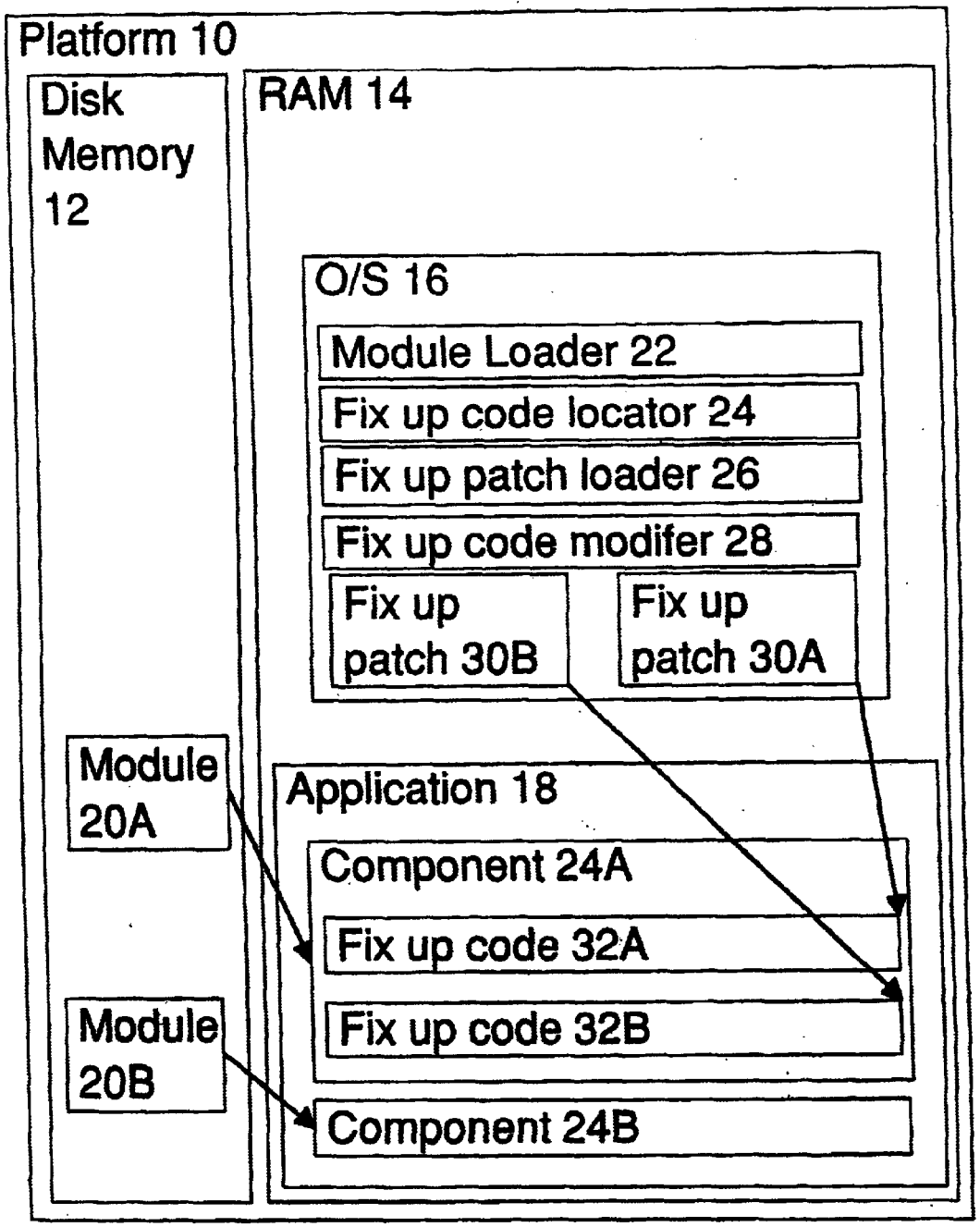
FIG. 1 is a schematic representation of the platform on which the embodiment of the invention runs.

Referring to FIG. 1, a computer platform 10 comprising a processor (not shown) having disk memory 12 and RAM 14 is shown at a time after an operating system 16 is loaded into the RAM 14 but before an application 18 is fully loaded. The disk memory 12 stores modules 20A,B in the form of dynamic link library files which make up the pre loaded application. Once loaded into RAM 14 the application 18 comprises components 24A, B which correspond to the modules 20A,B. The components comprise sequences of code 32A,B which may need to be modified depending on various factors including the type of operating system, type of platform, or whether the platform is a single or multi processor. As well as basic operating system functionality, the operating system further comprises a dynamic module loading capacity. In the present embodiment the dynamic module loading capacity comprises: module loader 22; fix up locator 24; patch selector 26; code modifier 28; and patches 30A,B. For instance the platform could be a Pentium based processor having an OS/2 or Windows operating system. However the embodiment may be implemented on any working platform and operating system that has dynamic link loading or on an operating system adapted to dynamically load modules as described in the embodiment.

Figure 2:
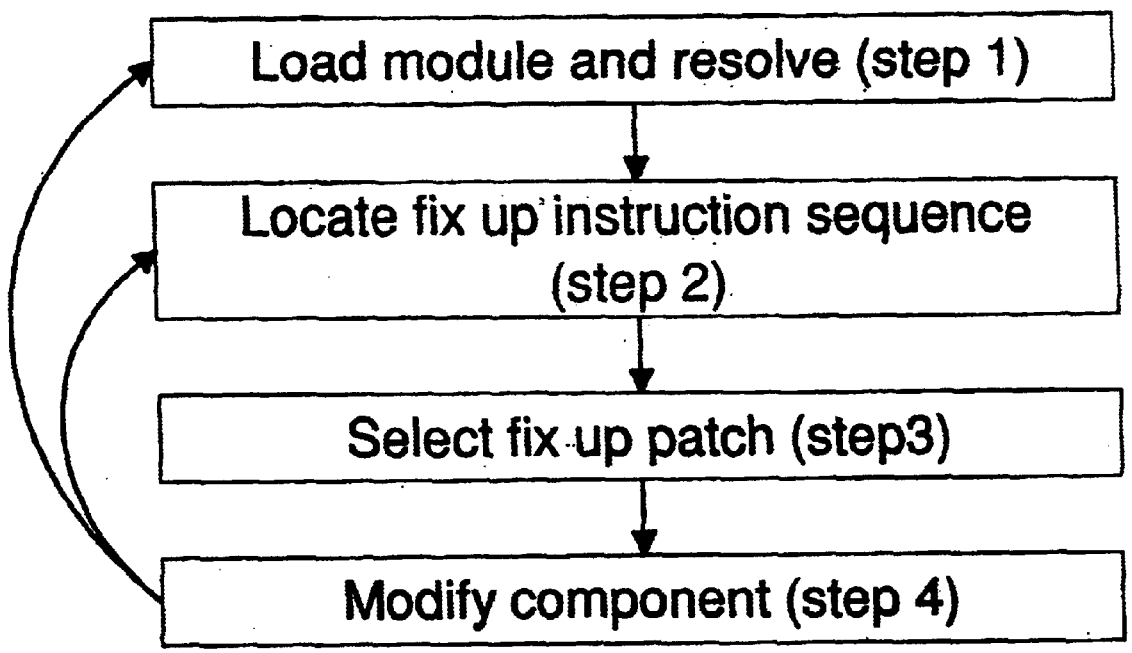
FIG. 2 is a representation of the method of the embodiment of the invention.

Referring to FIG. 2, module loader 22 locates module 20A in the disk memory and loads (step 1) it into the application 18 to form a component 24A of the application. Fix up code locator 24 parses component 24A for fix up code such as indicated at 32A and 32B (step 2). Patch selector 26 matches fix up code with available patches such as 30A and 30B (step 3). In this case Patch selector 26 matches fix up code 32A with DLL patch 30A. Code modifier 28 uses patch 30A to overwrite the fix up code 32A (step 4). A repeat of this step takes place for fix up code 32B and DLL patch 30B.

In this embodiment each module is loaded one at a time and step 1 repeats for module 20B and any other module in disk memory 12 after the following steps have finished but in another embodiment all the modules may be loaded at the same time before step 2 is carried out. In this embodiment fix up code locator 24 searches for platform specific parts one part at a time (step 2) and moves to step 3 after each hit. However in another embodiment it may locate all the platform specific parts at once before step 3 and create a table of the parts and their location in the component. In this embodiment a match of one fix up location with a patch is made and then the process moves to modify the component in step 4. However in another embodiment the patch selector may match all the fix up locations in a table with corresponding patches. In this embodiment each fix up location is modified (step 4) with a corresponding patch before another module is located (step 2). However in another embodiment the code modifier may modify a number of platform specified parts listed in a table with a corresponding patch.

In the embodiment an actual lock prefix instruction is imported from another dynamic link library

| EXTERN LOCKOPC:ABS | ;this declares symbol "LOCKOPC" as a constant with external value |
|---|---|
| db  LOCKOPC | ; LOCKOPC is an external reference, which will be patched on loading to either nop or lock. "db" defines a byte with a value of LOCKOPC |
| inc  [counter] | ; increment counter |

LOCKOPC is defined in another dynamic link library. Two versions are built, one for single processor machines, where it resolves to a 'nop' instruction (see FIG. 3B), and the other for a multiprocessor machine, where it resolves to a 'lock' instruction (see FIG. 3C). For single processor machines:

| | |
|---|---|
| LOCKOPC EQU 090h | ; from the assembler point of view this defines LOCKOPC as 90 in hex which is the operational code (op code) for no operation (nop). |
| PUBLIC LOCKOPC | ; makes LOCKOPC visible from outside the source file |
| For multi-processor machines | |
| LOCK1 EQU 0F0h | ; lock instruction prefix |
| | PUBLIC LOCK1 |

Both versions are built into a dynamic link library of the same name. The appropriate version is then installed or made available to the operating system depending on whether the single or multi-processor version is required.

When the application program is run, the program code is loaded, and the external references to other dynamic link libraries are resolved. Normally these are references to addresses of routines in other dynamic link libraries, and these addresses are patched into the program. For example, with code such as EXTRN func1:proc call proc the procedure 'proc' is declared in another file, which can be compiled and built as a dynamic link library. When the program is loaded by the operating system ready for execution, extern references such as to 'proc' are resolved by loading the dynamic link library containing the routine 'proc' and then patching all references to 'proc' in the application program to the address in memory of the routine 'proc' in the dynamic link library.

Figure 3A:
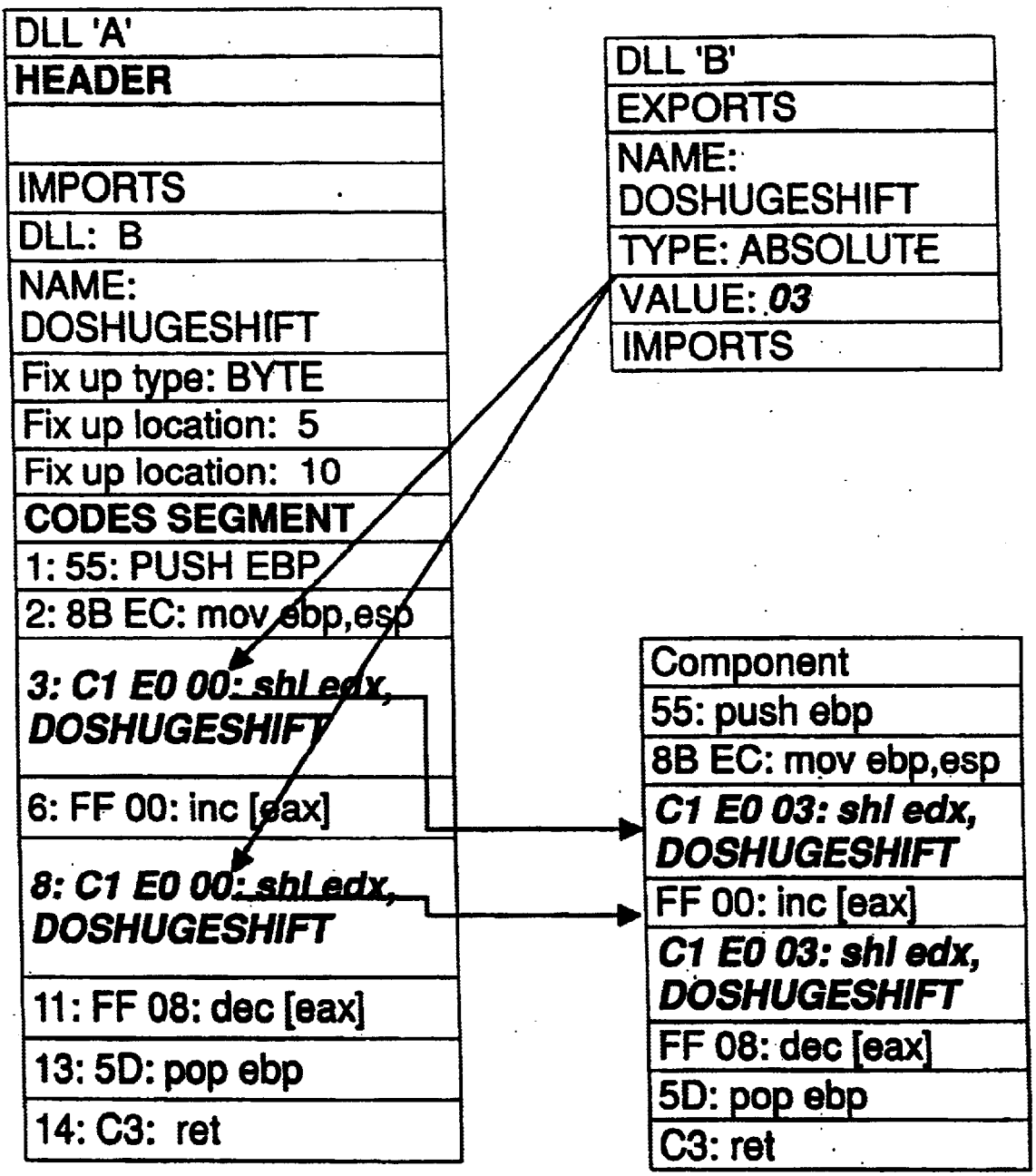
FIG. 3A is a representations of the code manipulations generated by the prior art.

Occasionally absolute values can be imported from a DLL. These are not addresses within a loaded DLL, but absolute values contained within the DLL, which are fixed no matter where the DLL is loaded in memory. For example, in OS/2 the constant DOSHUGESHIFT is exported from DOSCALLS.DLL (see FIG. 3A).

| | |
|---|---|
| EXTRN DOSHUGESHIFT:abs | ; declare an external absolute variable DOSHUGESHIFT |
| mov ecx, DOSHUGESHIFT | ; move the value of DOSHUGESHIFT to register ecx |
| shl eax, cl | ; shift register eax by the count held in register cl (lower 8 bits of reg ecx) |

In the embodiment instruction sequences are patched, so instead of the loader patching a 32-bit address, the dynamic link library exports an absolute value (rather than the address of a routine inside the DLL), and the loader uses this absolute value to patch an 8-bit byte in program memory, which is treated as an instruction.

In known dynamic linking a DLL 'A' is loaded as part of the loading of an appplication, Some address references in the DLL are not fully resolved and the relocation table within the DLL specifies that certain call addresses in code need to be replaced with the real address of the routines held in another DLL 'B' this patching occurs as both DLL 'A' and DLL 'B' are loaded into memory for the application. Call instructions are now resolved such that a call to a subroutine specified as being in DLL 'B' is made by calling into code held in DLL 'B'.

In certain known situation (see FIG. 3A) rather than patching a destination address an absolute data value is dynamically patched. For example the symbol 'DOSHUGESHIFT' is a symbol exported by the OS/2 Kernel DLL which on some versions of the operating system has a value of 123 (decimal), and on others 3 (decimal). This kernel DLL is called DLL 'B' in FIG. 3A. Different versions of DLL 'B' exist for different versions of the operating system and the appropriate version is installed as the whole operating system is installed. If a DLL 'A' imports the symbol 'DOSHUGESHIFT' then on loading the correct value for the version of the operating system will be patched into the data field of the instructions in the code for DLL 'A'.

Examples of the embodiments are now described with reference to FIGS. 3B and 3C.

Figure 3B:
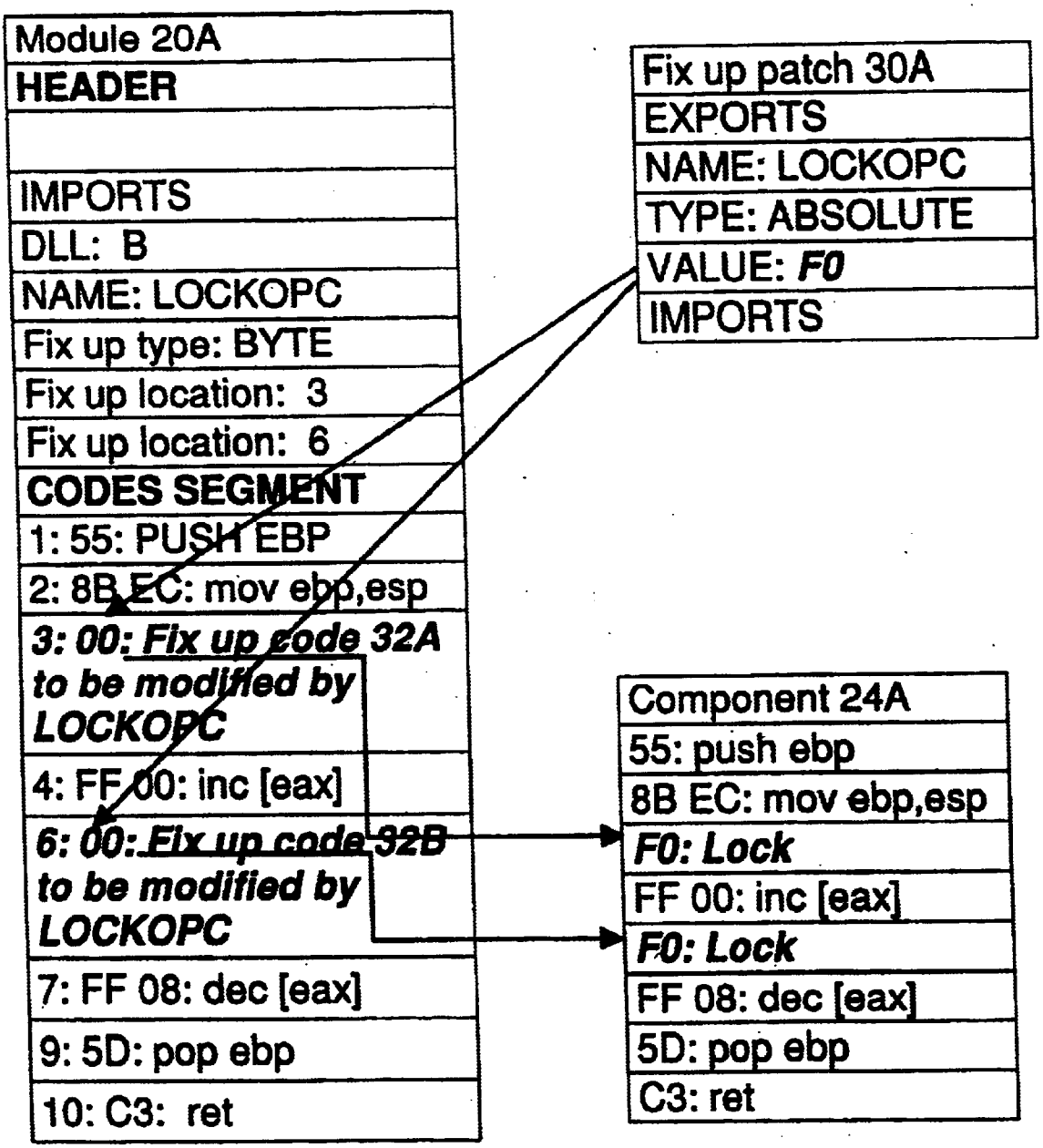
FIGS. 3B and C are representations of the code manipulations of the embodiment of the invention.
Figure 3C:
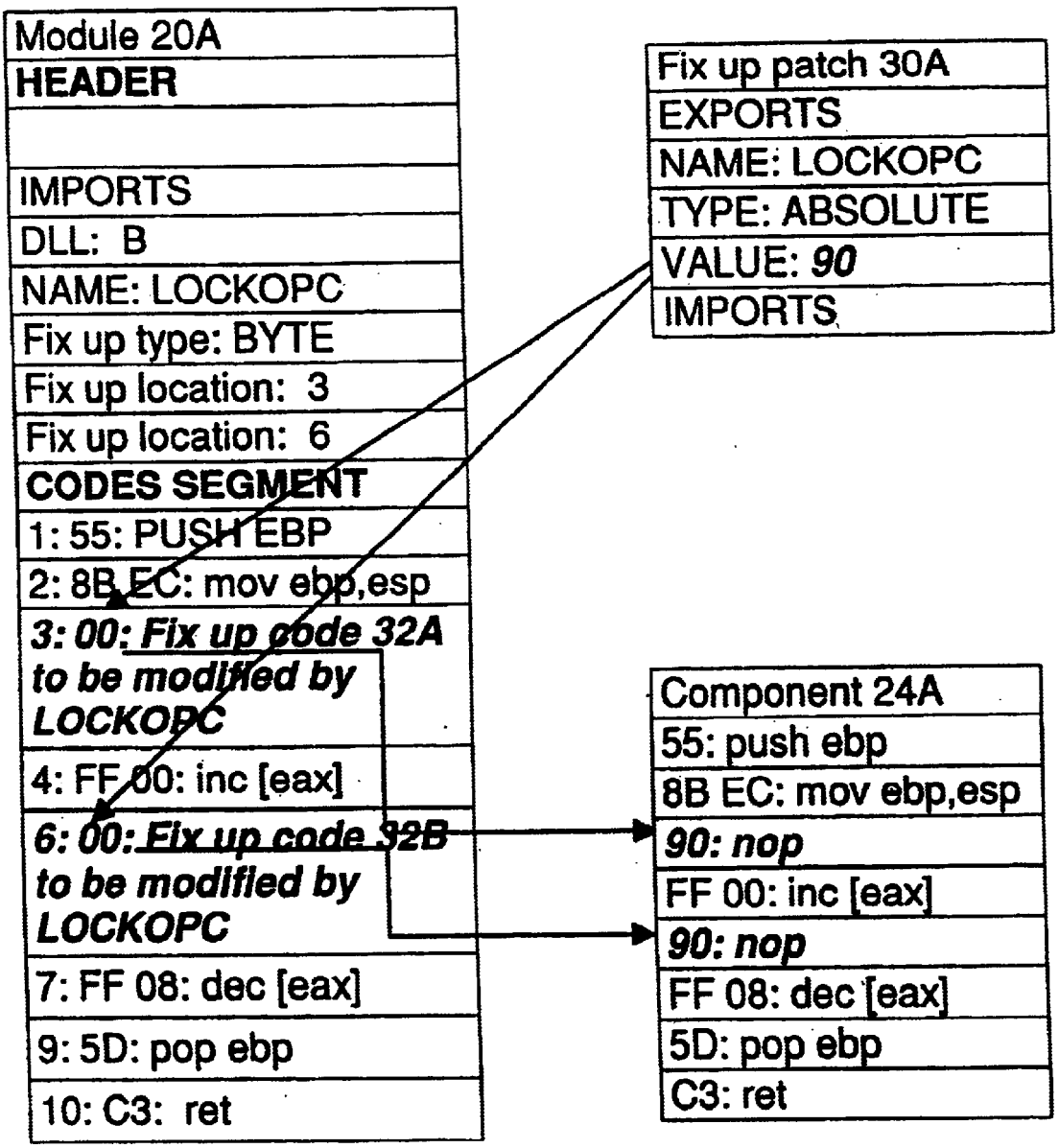

An embodiment of the invention is depicted in FIG. 3B. The code segment and header of module 20A is loaded into memory. The relocation table for module 20A specifies that a relocation of the symbol 'LOCKOPC' in module 30A must be applied to locations 3 and 6 in the code segment for module 20A. The operating system loaded then loads module 20B and resolves the reference to symbol 'LOCKOPC' to an absolute value held in the module. In the FIG. 3B version of the operating system the value is 0xF0. This absolute value is then patched into module 20A at locations 3 and 6 where it acts as a opcode 'LOCK' prefix for the 'INC' and 'DEC' instructions. This makes the instructions safe to use on a multithreaded program on multiprocessor system. The 'LOCK' prefix ensures that the system memory bus is locked for the duration of the instructions, so no other processor can update the memory location between the read, the increment/decrement, and the write.

On a single processor system the 'LOCK' prefix is inefficient because it locks the system bus and bypasses the data cache in the memory subsystem. It is desirable that this prefix is not used on a single processor system, but maintaining two versions of the program is complex and patching the code at run-time means that the code segment is in writable memory, so could be corrupted by an errant program. By using this invention then on a single processor machine a different version of module 30A would be installed with the operating system such that the symbol 'LOCKOPC' has the value 0x90 (see FIG. 3C). On Intel 286, 386, 486, Pentium and Pentium II this is a 'NOP' or no-operation instruction. The processor executes the 'NOP' instruction, then the actual 'INC' or 'DEC' instruction as a separate instruction. As the 'INC' or 'DEC' does not have the lock prefix it can execute using the data cache, so executes much faster, and the speed up outweighs the small cost of executing the 'NOP' instruction which is only needed to fill in the space in the program left by not having the 'LOCK' prefix there. If the operating system does not supply a module 30A then the application program could install one of two versions of module 30A depending on whether it was installed on a single or multiprocessor system.

Windows is a trademark of Microsoft Corporation.

Pentium is a trademark of Intel Corporation.

OS/2 is a trademark of IBM Corporation.

Example of IBM Operating System/2 application program (extracts thereof).

--- appl.asm: ; name of application source file
EXTERN LOCKOPC:ABS
db LOCKOPC   ; LOCKPOC is an external reference, which will be patched on loading to either nop or lock
inc [counter]

-continued

```
app1.def:                ; module definition file (builds
                           header for module 20A)
NAME app1                ; name of module
CODE SHARED
DATA MULTIPLE NONSHARED
IMPORTS
    LOCK.LOCKOPC
lockuni.asm:             ; 1st DLL for a single processor
                           environment
LOCKOPC EQU 090h         ; nop instruction
PUBLIC LOCKOPC           ; make it visible outside assembler
                           file
lockuni.def
LIBRARY LOCK             ; defines a DLL named LOCK
CODE SHARED
DATA NONE
EXPORTS
    LOCKOPC              ; defines a symbol LOCKOPC for export
                           from DLL:LOCK
lockmulti.asm:           ; 2nd DLL for multiprocessor
                           envoironment
LOCKOPC EQU 0F0h         ; lock instruction prefix
PUBLIC LOCK1
lockmulti.asm:
LIBRARY LOCK
CODE SHARED
DATA NONE
EXPORTS
    LOCK1
```

Upon installation, LOCKUNI.DLL or LOCKMULTI.DLL is installed and renamed as LOCK.DLL, as appropriate. As well as the lock prefix, other instructions that could be patched could be a call instruction for debugging. for example:

call subroutine1 test eax, OFFSET FLAT:subroutine1; this retains the address but effectively is a no operation for five bytes, that is no register values are changed.

By patching the 0A9h of the call instruction to 0E8h the call instruction is converted into a test instruction, bypassing the subroutine call, not affecting any of the registers, and only affecting the flags. This could be used to selectively include a trace facility in debug, but not production builds of a product.

Other instructions which could usefully be patched by absolute values include offsets into structures. Normally structure sizes must be maintained across DLL versions to preserve compatibility. If the offsets are imported as dynamic values, then the offsets can change independently of the application program.

```
EXTRN dataoffset3:ABS
    mov eax, [esi + dataitem3]
then in another module
Version 1
dataitem1 STRUC
    item1    DB    ?    ; declares a byte field in the
structure of unknown value (indicated by "?")
    item2    DW    ?    ; declares a double byte field
    dataitem3 DD   ?    ; declares a four byte field
dataitem1 ENDS
PUBLIC dataitem3
```

If the structure definition is changed to that below then the application program will continue to work without recompilation or static linking, because at load time the offset will be patched to the correct value.

```
Version 2
dataitem1 STRUC
    item1       DB    ?
    extraitem   DD    ?    ; subsequent items are displaced
by the extra field
    item2       DW    ?
    dataitem3   DD    ?
dataitem1 ENDS
```

Whole instructions could also be patched, provided they were 1, 2 or 4 bytes in size, corresponding in size to the types of patching that the operating system loader could patch.

```
EXTERN INCEAX:abs
db INCEAX
And INCEAX could be defined as 0040FF90h or 0040FFF0h,
corresponding to
NOP
INC DWORD PTR [EAX+0]    ; increment the four bytes at
the location pointed to by reg EAX+0
or
LOCK INC DWORD PTR [EAX+0]
```

Now that the invention has been described by way of a preferred embodiment, various modifications and improvements will occur to those person skilled in the art. Therefore it should be understood that the preferred embodiment has been provided as an example and not as a limitation.

What is claimed is:

1. A method of resolving a program code module in a computer platform, said method comprising:
   loading a first module into memory, said first module defining a fix-up location within the first module for specified operation code and said first module identifying a second module;
   locating said second module, said second module comprising a patch for the specified operation code;
   loading the patch of the second module at the fix-up location of the first module; and
   modifying the specified operation code with the patch.

2. A method according to claim 1, wherein the first module comprises more than one operation code location for modifying.

3. A method according to claim 1, wherein each location comprises a plurality of same or different operation codes and respectively relates to a plurality of same or different patches, and
   wherein a relationship between each operational code and each patch is defined in a header.

4. A method according to claim 1, wherein finding the fix-up location in the module comprises looking up fix-up references in a table within a header of the module.

5. A method according to claim 1, wherein the computer platform comprises an operating system comprising at least one patch for a fix-up location.

6. A method according to claim 1, wherein the second module is preloaded into the computer platform and remains there and is preloaded with initialization of the first module application.

7. A method according to claim 1, wherein the the second module is loaded on demand from a same source as the first module.

8. A method according to claim 1, wherein the patch is superimposed over the fix-up location by directly loading into that memory location.

9. A method according to claim 1, wherein the patch is exported from a dynamic link library.

10. A method according to claim 1, wherein the first and second modules comprise dynamic link library files.

11. A method according to claim 1, wherein the instruction at fix-up location comprises a no-operation instruction, and an option of superimposing a prefix operation for a following operation is allowed.

12. A method according to claim 11, wherein the prefix operation comprises a lock operation to lock memory from any other processor during a modify read write instruction.

13. A method according to claim 1, wherein the instruction at the fix-up location comprises a call subroutine instruction, and the patch cancels the call subroutine instruction.

14. A method according to claim 1, wherein the fix-up location is an offset into a structure, and the patch modifies the offset.

15. The method according to claim 1, wherein said modifying the specified operation code comprises overwriting the fix-up location with a fix-up code from a dynamic link library patch.

16. The method according to claim 1, wherein said modifying the specified operation code comprises using a dynamic linking facility of an operating system to patch instruction sequences devoid of using any of an offset and a link to an address routine.

17. The method of claim 1, wherein said modifying the specified operation code comprises exporting an absolute value from a dynamic link library; and patching, using the absolute value, instruction sequences in said memory.

18. The method of claim 17, wherein said patching comprises loading an 8-bit data into said memory, wherein said data comprises an instruction.

19. An operating system for resolving a program code module into a computer platform, said operating system comprising:

means for loading a first module into memory, said first module defining a fix-up location within the first module for specified operation code, and said first module identifying a second module;

means for locating said second module, said second module comprising a patch for the specified operation code; and means for loading the patch of the second module at the fix-up location of the first module, thereby modifying the specified operation code with the patch.

20. The operating system according to claim 19, wherein each fix-up location comprises a plurality of same or different operation codes and respectively relates to a plurality of same or different patches, and wherein a relationship between each specified operation code and each patch is defined in a header.

21. The operating system according to claim 19 wherein said means for loading the patch of the second module comprises means for overwriting the fix-up location with a fix-up code from a dynamic link library patch.

22. The operating system according to claim 19, wherein said means for loading the patch of the second module comprises means for using a dynamic linking facility of an operating system to patch instruction sequences without using offsets or linking to address routines.

23. The operating system according to claim 19, wherein said means for loading the patch of the second module comprises means for exporting an absolute value from a dynamic link library; and means for patching, using the absolute value, instruction sequences in said memory.

24. A program module for loading into a computer platform, said program module comprising:

a first module; and a fix-up location within the first module for a specified operation code, said first module identifying a second module, said second module comprising a patch for the specified operation code, wherein the patch of the second module is loadable at the fix-up location of the first module, thereby modifying the specified operation code with the patch.

25. The program module of claim 24, wherein each fix-up location comprises a plurality of same or different operation codes and respectively relates to a plurality of same or different patches, and wherein a relationship between each specified operation code and each patch is defined in a header.

26. The program module of claim 24, wherein said modifying the specified operation code comprises overwriting the fix-up location with a fix-up code from a dynamic link library patch.

27. The program module of claim 24, wherein said modifying the specified operation code comprises using a dynamic linking facility of an operating system to patch instruction sequences without using offsets or linking to address routines.

28. An application program for loading into a computer platform, said application comprising at least one program module, said at least one program module comprising:

a first module;

a fix-up location within the first module for specified operation code; and a second module identified by said first module, said second module comprising a patch for the specified operation code, wherein the patch of the second module is loadable at the fix-up location of the first module, thereby modifying the specified operation code with the patch.

29. The application program of claim 28, wherein each fix-up location comprises a plurality of same or different operation codes and respectively relates to a plurality of same or different patches, and wherein a relationship between each specified operation code and each patch is defined in a header.

30. The application program of claim 28, wherein said modifying the specified operation code comprises overwriting the fix-up location with a fix-up code from a dynamic link library patch.

31. The application program of claim 28, wherein said modifying the specified operation code comprises using a dynamic linking facility of an operating system to patch instruction sequences without using offsets or linking to address routines.

* * * * *